United States Patent
Salant et al.

(10) Patent No.: US 10,525,680 B2
(45) Date of Patent: *Jan. 7, 2020

(54) FLEXIBLE PACKAGING MATERIAL

(71) Applicant: HP Indigo B.V., Amstelveen (NL)

(72) Inventors: Asaf Salant, Nes Ziona (IL); David Idan, Nes Ziona (IL); Raia Slivniak, Lod (IL); Albert Teishev, Rishon le-zion (IL); Amnon Levi, Gedera (IL)

(73) Assignee: HP Indigo B.V., Amstelveen (NL)

( * ) Notice: Subject to any disclaimer, the term of this patent is extended or adjusted under 35 U.S.C. 154(b) by 204 days.

This patent is subject to a terminal disclaimer.

(21) Appl. No.: 15/526,320

(22) PCT Filed: Nov. 12, 2014

(86) PCT No.: PCT/EP2014/074411
§ 371 (c)(1),
(2) Date: May 11, 2017

(87) PCT Pub. No.: WO2016/074718
PCT Pub. Date: May 19, 2016

(65) Prior Publication Data
US 2017/0361572 A1    Dec. 21, 2017

(51) Int. Cl.
*B32B 27/30* (2006.01)
*B29C 48/00* (2019.01)
(Continued)

(52) U.S. Cl.
CPC .......... *B32B 27/30* (2013.01); *B29C 48/0021* (2019.02); *B29C 48/0023* (2019.02); *B32B 1/02* (2013.01); *B32B 1/08* (2013.01); *B32B 15/08* (2013.01); *B32B 27/08* (2013.01); *B32B 27/10* (2013.01); *B32B 27/302* (2013.01); *B32B 27/306* (2013.01); *B32B 27/308* (2013.01);
(Continued)

(58) Field of Classification Search
CPC .. B32B 1/02; B32B 1/08; B32B 27/30; B32B 27/302; B32B 27/306; B32B 27/308; B32B 27/32; B32B 27/327; B32B 27/34; B32B 27/36; B32B 27/40; B29C 48/0021; B29C 48/0023
See application file for complete search history.

(56) References Cited

U.S. PATENT DOCUMENTS

| 5,561,014 A | 10/1996 | Kato |
| 6,262,174 B1 | 7/2001 | Cooper et al. |

(Continued)

FOREIGN PATENT DOCUMENTS

| CN | 102203196 | 9/2011 |
| EP | 1818171 | 8/2007 |

(Continued)

OTHER PUBLICATIONS

Andrew Lee, "Lamination", Edan Pring Services, Aug. 5, 2009, 1 page, http://www.edanprintservices.co.uk/lamination.htm.
(Continued)

*Primary Examiner* — Walter Aughenbaugh
(74) *Attorney, Agent, or Firm* — Dierker & Kavanaugh PC

(57) ABSTRACT

Flexible packaging materials with electrophotographically printed images or information, and processes for preparing such flexible packaging materials are disclosed.

17 Claims, 1 Drawing Sheet

(51) Int. Cl.

| | | |
|---|---|---|
| *B32B 27/08* | (2006.01) | |
| *B32B 27/10* | (2006.01) | |
| *B32B 27/32* | (2006.01) | |
| *B32B 1/08* | (2006.01) | |
| *B32B 1/02* | (2006.01) | |
| *B32B 27/34* | (2006.01) | |
| *B32B 27/36* | (2006.01) | |
| *B32B 27/40* | (2006.01) | |
| *B32B 15/08* | (2006.01) | |

(52) U.S. Cl.
CPC ............ *B32B 27/32* (2013.01); *B32B 27/327* (2013.01); *B32B 27/34* (2013.01); *B32B 27/36* (2013.01); *B32B 27/40* (2013.01); *B32B 2255/10* (2013.01); *B32B 2255/205* (2013.01); *B32B 2255/26* (2013.01); *B32B 2307/75* (2013.01); *B32B 2439/70* (2013.01)

(56) References Cited

U.S. PATENT DOCUMENTS

| | | | |
|---|---|---|---|
| 6,355,355 B1 | 3/2002 | Inoue et al. | |
| 6,824,868 B2 | 11/2004 | Bell et al. | |
| 7,086,666 B2 | 8/2006 | Richardson | |
| 7,261,795 B2 | 8/2007 | Wilkinson et al. | |
| 7,281,360 B1 | 10/2007 | Larimore et al. | |
| 7,416,823 B2 | 8/2008 | Yanagawa et al. | |
| 7,854,987 B2 | 12/2010 | Jaipuria | |
| 8,247,063 B2 | 8/2012 | Holbert et al. | |
| 8,356,459 B1 | 1/2013 | Larimore et al. | |
| 10,213,950 B2 * | 2/2019 | Salant | B32B 7/12 |
| 2011/0104441 A1 | 5/2011 | Bhattacharyya | |
| 2013/0052572 A1 | 2/2013 | Nukada et al. | |

FOREIGN PATENT DOCUMENTS

| | | |
|---|---|---|
| WO | WO-0140395 | 6/2001 |
| WO | WO-2005021251 | 3/2005 |
| WO | WO2010128175 | 11/2010 |
| WO | WO-2012006156 | 1/2012 |
| WO | WO-2014044322 | 3/2014 |

OTHER PUBLICATIONS

International Search Report and Written Opinion for International Application No. PCT/EP2014/074411 dated Jun. 19, 2015, 12 pages.

* cited by examiner

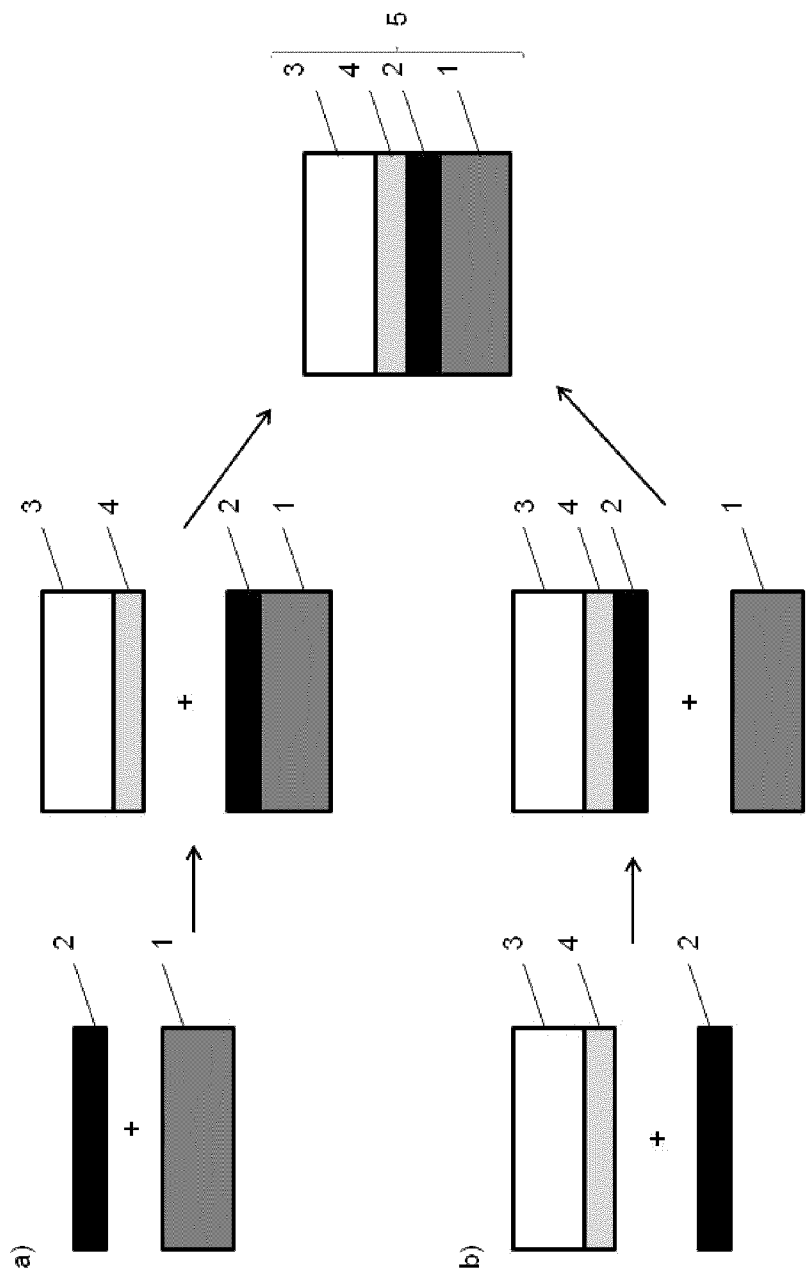

FLEXIBLE PACKAGING MATERIAL

BACKGROUND

All manner of consumer goods, in particular food products, are packaged using thin films or sheets of flexible packaging material, with images such as corporate branding, or product information printed onto the film. The flexible packaging material serves to protect the product from, for example, moisture, oxidation or pathogens, while also providing information to the user regarding the nature and origin of the product contained therein.

Liquid electrophotographic printing, or electrostatic printing, is one method by which images or information can be printed onto substrates such as paper or plastic. The printing processes typically involve creating an image on a photoconductive surface, applying an ink having charged particles to the photoconductive surface, such that they selectively bind to the image, and then transferring the charged particles in the form of the image to a print substrate.

BRIEF DESCRIPTION OF THE FIGURE

FIGS. 1a) and 1b) are schematic representations of processes for producing a flexible packaging material in accordance with the present disclosure.

DETAILED DESCRIPTION

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, colorant, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is typically suitable for use in an electrostatic printing process, sometimes termed an electrophotographic printing process. It may comprise pigment particles, which may comprise a thermoplastic resin.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "co-polymer" refers to a polymer that is polymerized from at least two monomers.

As used herein, "lamination bond strength" refers to the force (per length) required to delaminate a laminated material, and is expressed in units of Newton/inch, or N/in. The lamination bond strength can be measured according to standard techniques, in particular ASTM F0904-98R08. Unless otherwise stated, the lamination bond strength of a flexible packaging material described herein refers the strength to delaminate the material at the interface between a thermally activatable laminating material and either of the two materials to which the thermally activatable laminating material has bonded.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400 V/μm, or more, ins some examples 600-900V/μm, or more.

As used herein, "NVS" is an abbreviation of the term "non-volatile solids".

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a flexible packaging material, comprising:
 a flexible substrate comprising a first surface;
 an electrophotographic ink composition printed on the first surface of the flexible substrate, the printed electrophotographic link composition comprising a polymer resin comprising a copolymer of an alkylene monomer and a monomer selected from acrylic acid and methacrylic acid;
 a base material comprising one or more of a polyethylene, a bi-axially oriented polypropylene (BOPP), a polyethylene teraphthalate (PET), a paper and/or a metallic film; and
 a thermally activatable laminating layer disposed between and bonded to the base material and to the first surface of the flexible substrate printed with the electrophotographic ink composition.

In another aspect there is provided a process for preparing a flexible packaging material, comprising:
 printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
 providing a further flexible material comprising one or more of a polyethylene, a bi-axially oriented polypropylene (BOPP), a polyethylene teraphthalate (PET), a paper and/or a metallic film;
 depositing a thermally activatable laminating layer onto one of the further flexible material and the first surface of the substrate comprising the printed electrophotographic ink composition; and
 contacting under conditions of heat and/or pressure the thermally activatable laminating layer with the other of the further flexible material and the first surface of the substrate comprising the printed electrophotographic ink composition.

In another aspect there is provided a process for preparing a flexible packaging material, comprising:
 providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;
 providing a further flexible material comprising one or more of a polyethylene, a bi-axially oriented polypropylene (BOPP), a polyethylene teraphthalate (PET), a paper and/or a metallic film;
 depositing a thermally activatable laminating layer onto one of the further flexible material and the first surface of the substrate comprising the printed electrophotographic ink composition; and
 contacting under conditions of heat and/or pressure the thermally activatable laminating layer with the other of the further flexible material and the first surface of the substrate comprising the printed electrophotographic ink composition.

In another aspect there is provided a flexible packaging material prepared by a process comprising:
 printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
 providing a further flexible material comprising one or more of a polyethylene, a bi-axially oriented polypropylene (BOPP), a polyethylene teraphthalate (PET), a paper and/or a metallic film;
 depositing a thermally activatable laminating layer onto one of the further flexible material and the first surface of the substrate comprising the printed electrophotographic ink composition; and
 contacting under conditions of heat and/or pressure the thermally activatable laminating layer with the other of the further flexible material and the first surface of the substrate comprising the printed electrophotographic ink composition.

In another aspect there is provided a flexible packaging material prepared by a process, comprising:

providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;

providing a further flexible material comprising one or more of a polyethylene, a bi-axially oriented polypropylene (BOPP), a polyethylene teraphthalate (PET), a paper and/or a metallic film;

depositing a thermally activatable laminating layer onto one of the further flexible material and the first surface of the substrate comprising the printed electrophotographic ink composition; and contacting under conditions of heat and/or pressure the thermally activatable laminating layer with the other of the further flexible material and the first surface of the substrate comprising the printed electrophotographic ink composition.

Much research has been carried out in recent years to try to develop laminated flexible packaging materials comprising a functional (barrier) substrate laminated to a second substrate comprising a printed image or information. Many solvent based or even "solvent free" laminating adhesives require a prolonged period of curing, and so there is a lag time between a flexible packaging material being produced and the material being ready for packaging food. Thus, when used with digital printing processes, conventional laminating technologies negate the advantage of short turnaround on the printing process due to long post-printing processes/wait times.

The present inventors have found that examples of the method as described herein avoid or at least mitigate at least one of the difficulties described above. They have found that examples of the method are more successful than previous methods in that the lamination and bonding is immediate such that no cure time is required. The methods described can be implemented in-line with a conventional electrostatic printing process, thus further streamlining the process for producing flexible packaging materials.

Flexible Packaging Material

In one example, a flexible packaging material is described. The flexible packaging material may be produced by any of the methods described herein. Each component of the flexible packaging material will be discussed in the sections which follow.

In one example, the flexible packaging material comprises a laminate structure with sufficient bond strength to avoid delamination of the layers, in particular delamination at the interface between the layer of laminating material (which may be thermally activatable) and the surface of the print substrate comprising the electrophotographically printed image or information. In one example, the lamination bond strength is measured directly after the flexible packaging material has cooled to room temperature following lamination. In one example, the lamination bond strength is measured on a flexible packaging material that has not been subjected to any curing or rest period following lamination and cooling. In one example, the lamination bond strength is measured immediately after lamination and cooling of the flexible packaging material.

In one example, the flexible packaging material has a lamination bond strength as measured by ASTM F0904-98R08. In one example, the flexible packaging material has a lamination bond strength of at least about 0.5 N/inch, for example at least about 1.0 N/inch, for example at least about 1.2 N/inch, for example at least about 1.5 N/inch, for example at least about 2.0 N/inch, for example at least about 2.5 N/inch, for example at least about 3.0 N/inch, for example at least about 4.0 N/inch, for example at least about 5.0 N/inch, for example at least about 6.0 N/inch, for example at least about 7.0 N/inch, for example at least about 8.0 N/inch, for example at least about 9.0 N/inch, for example about 10.0 N/inch, as measured by ASTM F0904-98R08.

In one example, the flexible packaging material has a lamination bond strength of less than about 10 N/inch, for example less than about 9.0 N/inch, for example less than about 8 N/inch, for example less than about 7.0 N/inch, for example less than about 6.0 N/inch, for example less than about 5.0 N/inch, for example less than about 4.0 N/inch, for example less than about 3.0 N/inch, for example less than about 2.5 N/inch, for example less than about 2.0 N/inch, for example less than about 1.5 N/inch, for example less than about 1.2 N/inch, for example less than about 1.0 N/inch, for example about 0.5 N/inch, as measured by ASTM F0904-98R08.

Flexible (Print) Substrate

The flexible substrate, to which the liquid electrophotographic ink composition is to be printed (and thus is also referred to herein as the print substrate) may be any material suitable for use in a liquid electrophotographic printing process and suitable for use in a flexible packaging material. Since the flexible substrate forms the outermost layer of the final, laminated flexible packaging material as prepared in the methods described herein, in one example the flexible substrate is transparent in order that the printed image or information is visible to the consumer.

In one example, the flexible substrate comprises a film of a polymer, for example a thermoplastic polymer. In one example, the flexible substrate comprises a film of biaxially oriented polypropylene (BOPP), or polyethylene terephthalate (PET). Other suitable polymers will be known in the art and the examples provided above should be seen as non-limiting examples only.

In one example, the flexible substrate comprises a thin film of a polymer, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In one example, the film of polymer is about 12 µm in thickness.

In one example, the flexible substrate comprises a thin film of a polymer, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In one example, the film of polymer is about 100 µm in thickness.

In one example, the flexible substrate comprises an image or information printed on a first surface of the flexible substrate in a liquid electrophotographic printing process using a liquid electrophotographic composition as described herein. The image or information may be reverse printed onto the first surface of the substrate. The polymer resin of the printed composition may thus be available for thermally laminating the flexible substrate to the base layer or functional substrate described below, with a second surface of the flexible substrate forming the outermost surface of the flexible packaging material and the printed image or information appearing the right way round when viewed through the flexible substrate. In this way, the printed image or information is embedded within the multi-layer structure of the flexible packaging material and not on the outermost surface, and thus protected from damage.

Liquid Electrophotographic Printing (LEP) Composition

The liquid electrophotographic printing composition (also referred to herein as a LEP composition) useful in the methods described herein to form flexible packaging materials also described generally comprises a colorant or pigment, a polymer resin and a carrier fluid or liquid. The LEP composition may further comprise one or more additives such as charge directors, charge adjuvants, surfactants, viscosity modifiers, emulsifiers and the like. In some examples, the LEP composition may not contain any pigment, or comprise substantially zero pigment and thus be a pigment-free composition, useful in providing a particular transparent gloss or sheen to a printed substrate.

Each of these components will be described separately in the sub-sections which follow.

Colorant

The liquid electrophotographic ink composition may comprise a colorant. The colorant may be a dye or pigment. The colorant can be any colorant compatible with the liquid carrier and useful for electrophotographic printing. For example, the colorant may be present as pigment particles, or may comprise a resin (in addition to the polymers described herein) and a pigment. The resins and pigments can be any of those commonly used as known in the art. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

In some examples, the colorant or pigment particles may have a median particle size or $d_{50}$ of less than 20 µm, for example less than 15 µm, for example less than 10 µm, for example less than 5 µm, for example less than 4 µm, for example less than 3 µm, for example less than 2 µm, for example less than 1 µm, for example less than 0.9 µm, for example less than 08 µm, for example less than 0.7 µm, for example less than 0.6 µm, for example less than 0.5 µm. Unless otherwise stated, the particle size of the colorant or pigment particle and the resin coated pigment particle is determined using laser diffraction on a Malvern Mastersizer 2000 according to the standard procedure as described in the operating manual.

The colorant or pigment particle may be present in the method and/or electrostatic ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the colorant or pigment particle may be present in the method and/or electrostatic ink composition in an amount of at least 50 wt % of the total amount of resin and colorant or pigment, for example at least 55 wt % of the total amount of resin and colorant or pigment.

Polymer Resin

The liquid electrophotographic printing composition comprises a polymer resin comprising a copolymer of an alkylene monomer and a monomer selected from acrylic acid and methacrylic acid. The polymer resin may be referred to as a thermoplastic polymer. A thermoplastic polymer is sometimes referred to as a thermoplastic resin. In some examples, the polymer may comprise one or more of ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin comprises a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the liquid electrophotographic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition and/or the ink printed on the print substrate. The polymer having ester side groups may constitute from 5% to 50% by weight of the total amount of the resin polymers, e.g. thermoplastic resin polymers, in the liquid electrophotographic composition and/or the ink printed on the print substrate, in some examples 10% to 40% by weight of the total amount of the resin polymers, e.g. thermoplastic resin polymers, in the liquid electrophotographic composition and/or the ink composition printed on the print substrate, in some examples 5% to 30% by weight of the total amount of the resin polymers, e.g. thermoplastic resin polymers, in the liquid electrophotographic composition and/or the ink composition printed on the print substrate, in some examples 5% to 15% by weight of the total amount of the resin polymers, e.g. thermoplastic resin polymers, in the liquid electrophotographic composition and/or the ink composition printed on the print substrate in some examples 15% to 30% by weight of the total amount of the resin polymers, e.g. thermoplastic resin polymers, in the liquid electrophotographic composition and/or the ink composition printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the AC family of toners (e.g. AC-5120, AC-5180, AC-540, AC-580 (sold by Honeywell)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the solids of the liquid electrophotographic composition and/or the ink composition printed on the print substrate. The resin can constitute about 60 to 95%, in some examples about 70 to 95%, by weight of the solids of the liquid electrophotographic composition and/or the ink composition printed on the print substrate.

Carrier Liquid

In some examples, the LEP composition comprises resin coated pigment particles, or resin particles, which are formed in and/or dispersed in a carrier fluid or carrier liquid. Before application to the print substrate in the electrostatic printing process, the composition may be an electrostatic ink composition, which may be in dry form, for example in the form of flowable pigment particles coated with the thermoplastic resin. Alternatively, before application to the print substrate in the electrostatic printing process, the electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In one example, the carrier liquid is a liquid which does not dissolve the polymer resin at room temperature. In one example, the carrier liquid is a liquid which dissolves the polymer resin at elevated temperatures. For example, the polymer resin may be soluble in the carrier liquid when heated to a temperature of at least 80° C., for example 90° C., for example 100° C., for example 110° C., for example 120° C. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, IsoparG™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of the electrostatic ink composition, in some examples 50% to 99.5% by weight of the electrostatic ink composition. Before printing, the carrier liquid may constitute about 40 to 90% by weight of the electrostatic ink composition. Before printing, the carrier liquid may constitute about 60% to 80% by weight of the electrostatic ink composition. Before printing, the carrier liquid may constitute about 90% to 99.5% by weight of the electrostatic ink composition, in some examples 95% to 99% by weight of the electrostatic ink composition.

The ink, when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Charge Director and Charge Adjuvant

The liquid electrophotographic composition and/or the ink composition printed on the print substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, but not limited to, metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula:

[$R_a$—O—C(O)CH$_2$CH(SO$_3^-$)C(O)—O—$R_b$], where each of $R_a$ and $R_b$ is an alkyl group. In some examples, the charge director comprises nanoparticles of a simple salt and a sulfosuccinate salt of the general formula MA$_n$, wherein M is a metal, n is the valence of M, and A is an ion of the general formula [$R_a$—O—C(O)CH$_2$CH(SO$_3^-$)C(O)—O—$R_b$], where each of $R_a$ and $R_b$ is an alkyl group, or other charge directors as found in WO2007130069, which is incorporation herein by reference in its entirety. As described in WO2007130069, the sulfosuccinate salt of the general formula MA$_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, NH$_4$, tert-butyl ammonium, Li$^+$, and Al$^{+3}$, or from any sub-group thereof. The simple salt may comprise an anion selected from SO$_4^{2-}$, PO$^{3-}$, NO$_3^-$, HPO$_4^{2-}$, CO$_3^{2-}$, acetate, trifluoroacetate (TFA), Cl$^-$, Bf, F$^-$, ClO$_4^-$, and TiO$_3^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further comprise basic barium petronate (BBP).

In the formula [$R_a$—O—C(O)CH$_2$CH(SO$_3^-$)C(O)—O—$R_b$], in some examples, each of $R_a$ and $R_b$ is an aliphatic alkyl group. In some examples, each of $R_a$ and $R_b$ independently is a C$_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is C$_{13}$H$_{27}$. In some examples, M is Na, K, Cs, Ca, or Ba. The formula [$R_a$—O—C(O)CH$_2$CH(SO$_3^-$)C(O)—O—$R_b$] and/or the formula MA$_n$ may be as defined in any part of WO2007130069.

The charge director may comprise (i) soya lecithin, (ii) a barium sulfonate salt, such as basic barium petronate (BPP) and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples 0.01 to 20% by weight, in some examples 0.01 to 10% by weight, in some examples 0.01 to 1% by weight of the solids of the electrostatic ink composition and/or ink composition printed on the print substrate. The charge director can constitute about 0.001 to 0.15% by weight of the solids of the liquid electrophotographic ink composition and/or ink composition printed on the print substrate, in some examples 0.001 to 0.15%, in some examples 0.001 to 0.02% by weight of the solids of the liquid electrophotographic ink composition and/or ink composition printed on the print substrate. In some examples, the charge director imparts a negative charge on the electrostatic ink composition. The particle conductivity may range from 50 to 500 μmho/cm, in some examples from 200-350 pmho/cm.

The liquid electrophotographic ink composition and/or ink composition printed on the print substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic ink composition and/or ink composition printed on the print substrate. The charge adjuvant can constitute about 0.5 to 4% by weight of the solids of the liquid electrophotographic ink composition and/or ink composition printed on the print substrate. The charge adjuvant can constitute about 1 to 3% by weight of the solids of the liquid electrophotographic ink composition and/or ink composition printed on the print substrate.

Other Additives

The electrophotographic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Base Material

The base material of the flexible packaging material may also be referred to as a further flexible material, a flexible base layer, a functional substrate or simply a base layer. The base layer of the flexible packaging material may be the innermost layer of the flexible packaging material in use, and may thus be in contact with the packaged goods. In one example the base layer is referred to as a functional substrate and is functional in the sense that it provides a barrier function to protect the packaged goods. The base layer or functional substrate may serve as a barrier to any external influence that could damage or otherwise reduce the quality of the packaged goods, in particular food, by preventing ingress of, for example, moisture, oxygen, other oxidants and pathogens such as viruses and bacteria.

In one example, the base material comprises a thin film or sheet of one or more of paper, metallic foil, and plastic. In one example, the base material comprises a metallized paper or a metallized plastic film. In one example, the base material comprises an aluminium foil. In one example the base material comprises a thin film of a plastic material, for example, polyethylene (PE), linear low density polyethylene (LLDPE), low density polyethylene (LDPE), polypropylene (PP), biaxially oriented polypropylene (BOPP). In one example, the base material comprises a metallized paper in the form of a paper substrate coated on one surface with a layer of metal, for example aluminium. In one example, the base material comprises a metallized plastic film in the form of a polymer substrate coated on one surface with a layer of metal, for example aluminium. In one example, the base material comprises a metallized plastic film in the form of a metallized BOPP film, a metallized PET film, or a metallized polyethylene (PE) film.

In one example, the base layer comprises a thin film of material, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In one example, the film of material is about 12 µm in thickness.

In one example, the base layer comprises a thin film of material, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In one example, the film of material is about 100 µm in thickness.

In one example, the base layer of the flexible packaging material comprises a sealant layer on a surface thereof other than the surface on which the thermally activatable laminating layer is applied. In this example, the sealant layer is disposed on the innermost surface of the flexible packaging material and serves to provide means for sealing the flexible packaging material to itself or another material, with the goods to be packaged inside. In one example the sealant layer comprises a film of low-melting, i.e. heat sealable, thermoplastic material. Suitable thermoplastic materials include those described herein in connection with the polymer resin and/or the thermally activatable laminating material and include polymers of ethylene, or DuPont's SUR-LYN ® ionomers. In one example, the sealant layer comprises an extrudable material.

In one example, the sealant layer comprises a thin film of a polymer, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In one example, the film of polymer is about 12 µm in thickness.

In one example, the sealant layer comprises a thin film of a polymer, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In one example, the film of polymer is about 100 µm in thickness.

Thermally Activatable Laminating Layer

The flexible packaging material and the processes for preparing the flexible packaging material comprise a thermally activatable laminating layer, also referred to as a thermal laminating material or layer or thermally activatable laminating material.

In one example, the thermally activatable laminating layer comprises a polymer resin, for example a thermoplastic polymer resin. In some examples the thermally activatable laminating layer comprises a low-melting polymer. The term "low-melting polymer" is to be understood as a polymeric material which is solid at room temperature but melts at a temperature typically obtainable in a printing or laminating apparatus.

In some examples, the thermally activatable laminating layer or material may comprise a low-melting polymer with a melting point of less than about 200° C., for example less than about 190° C., for example less than about 180° C., for example less than about 170° C., for example less than about 160° C., for example less than about 150° C., for example less than about 140° C., for example less than about 130° C., for example less than about 120° C., for example less than about 110° C., for example less than about 100° C., for example less than about 90° C., for example about 80° C.

In some examples, the thermally activatable laminating layer or material may comprise a low-melting polymer with a melting point of greater than about 80° C., for example greater than about 90° C., for example greater than about 100° C., for example greater than about 110° C., for example greater than about 120° C., for example greater than about 130° C., for example greater than about 140° C., for example greater than about 150° C., for example greater than about 160° C., for example greater than about 170° C., for example greater than about 180° C., for example greater than about 190° C., for example about 200° C.

By using a low-melting polymer as the thermally activatable laminating material to form the thermally activatable laminating layer, it becomes possible to extrude the thermally activatable laminating material onto the base material to form a layered structure for laminating to the printed substrate.

In one example, the thermally activatable laminating layer comprises a thin film of a polymer, wherein the film is less than 10 µm in thickness, for example less than 9 µm in thickness, less than 8 µm in thickness, less than 7 µm in thickness, less than 6 µm in thickness, less than 5 µm in thickness, less than 4 µm in thickness, less than 3 µm in thickness. In one example, the film of polymer is about 2 µm in thickness.

In one example, the thermally activatable laminating layer comprises a thin film of a polymer, wherein the film is greater than 2 µm in thickness, for example greater than 3 µm in thickness, greater than 4 µm in thickness, greater than 5 µm in thickness, greater than 6 µm in thickness, greater than 7 µm in thickness, greater than 8 µm in thickness, greater than 9 µm in thickness. In one example, the film of polymer is about 10 µm in thickness.

In one example, the thermally activatable laminating layer comprises a thin film of a polymer, wherein the film has a coating weight of less than 10 grams per square metre (gsm), for example less than 9 gsm, less than 8 gsm, less than 7 gsm, less than 6 gsm, less than 5 gsm, less than 4 gsm, less than 3 gsm. In one example, the weight of the film of polymer is about 2 gsm.

In one example, the thermally activatable laminating layer comprises a thin film of a polymer, wherein the film is greater than 2 gsm in weight, for example greater than 3 gsm, greater than 4 gsm, greater than 5 gsm, greater than 6 gsm, greater than 7 gsm, greater than 8 gsm, greater than 9 gsm. In one example, the weight of the film of polymer is about 10 gsm.

In some examples, the polymer may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers, urethane polymers and combinations thereof.

The thermally activatable laminating layer or material may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The thermally activatable laminating layer or material may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The thermally activatable laminating layer or material may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The thermally activatable laminating layer or material may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g,in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The thermally activatable laminating layer or material may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the thermally activatable laminating layer or material comprises a single type of polymer, the polymer may have a melt viscosity of 6000 poise or more, in some examples a melt viscosity of 8000 poise or more, in some examples a melt viscosity of 10000 poise or more, in some examples a melt viscosity of 12000 poise or more. If the thermally activatable laminating layer or material comprises a plurality of polymers all the polymers may together form a mixture that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The thermally activatable laminating layer or material may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The thermally activatable laminating layer or material may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The thermally activatable laminating layer or material may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The thermally activatable laminating layer or material may comprise a thermoplastic polyurethane. Thermoplastic polyurethanes are formed during a polyaddition reaction between a diisocyanate, a polyol or long-chain diol and a chain extender or short-chain diol. Suitable thermoplastic polyurethanes include the Irogran®, Avalon®, Krystalgran® and Irostic® families available from Huntsman, and the Pureseal family of polymers from Ashland.

The thermoplastic polyurethane may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the thermally activatable laminating material can in some examples be selected from the Nucrel family of polymers (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the AC family of polymers (e.g. AC-5120, AC-5180, AC-540, AC-580 (sold by Honeywell)), the Aclyn family of polymers (e.g. Aclyn 201, Aclyn 246, Aclyn 285, and Aclyn 295), the Lotader family of polymers (e.g. Lotader 2210, Lotader, 3430, and Lotader 8200 (sold by Arkema)), the Pureseal family of polymers (e.g. Pureseal HS1040 and Pureseal HS1020 (sold by Ashland)).

Process for Preparing the Flexible Packaging Material

Described herein is a process for preparing a flexible packaging material, comprising:
- printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
- providing a further flexible material comprising one or more of a polyethylene, a bi-axially oriented polypropylene (BOPP), a polyethylene teraphthalate (PET), a paper and/or a metallic film;
- depositing a thermally activatable laminating layer onto one of the further flexible material and the first surface of the substrate comprising the printed electrophotographic ink composition; and
- contacting under conditions of heat and/or pressure the thermally activatable laminating layer with the other of the further flexible material and the first surface of the substrate comprising the printed electrophotographic ink composition.

Also described herein is a process for preparing a flexible packaging material, comprising:
- providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;
- providing a further flexible material comprising one or more of a polyethylene, a bi-axially oriented polypropylene (BOPP), a polyethylene teraphthalate (PET), a paper and/or a metallic film;
- depositing a thermally activatable laminating layer onto one of the further flexible material and the first surface of the substrate comprising the printed electrophotographic ink composition; and
- contacting under conditions of heat and/or pressure the thermally activatable laminating layer with the other of the further flexible material and the first surface of the substrate comprising the printed electrophotographic ink composition.

The processes of the present disclosure are depicted generally in FIGS. 1a) and 1b), in which the following reference numerals are used to identify the features indicated: reference numeral "1" denotes a flexible base layer or material; reference numeral "2" denotes a thermally activatable laminating layer; reference numeral "3" denotes a flexible or print substrate; reference numeral "4" denotes a electrophotographic ink composition and reference numeral "5" denotes a flexible packaging material.

FIG. 1a) depicts a process in which a thermally activatable laminating layer 2 is deposited onto a flexible material 1. The thermally activatable laminating layer 2 is then contacted with a first surface of a flexible or print substrate 3 comprising a printed electrophotographic ink composition 4 in a thermal laminating step to form a flexible packaging material 5.

FIG. 1b) depicts a process in which a thermally activatable laminating layer 2 is deposited onto a first surface of a flexible or print substrate 3 comprising a printed electrophotographic ink composition 4. The thermally activatable laminating layer 2 is then contacted with a flexible material 1 in a thermal laminating step to form a flexible packaging material 5.

Each step of the processes will be described in more detail below.

In one example, a process for preparing a flexible packaging material comprises a step of printing a liquid electrophotographic ink composition onto a first surface of a flexible substrate, or providing a first flexible material comprising a substrate and an electrophotographic ink composition printed onto a first surface of the substrate.

In one example, the substrate comprises a flexible substrate as described herein previously. In one example, the liquid electrophotographic ink composition used in the process comprises a composition as described herein previously. The liquid electrophotographic ink composition may be printed onto the first surface of the flexible substrate in a conventional electrophotographic or electrostatic printing process using a conventional electrophotographic or electrostatic printing apparatus. Examples of suitable electrophotographic or electrostatic printing equipment are the HP Indigo digital presses.

In one example, the flexible substrate comprises a transparent material and the liquid electrophotographic ink composition is printed onto a first surface thereof in a reverse printing process such that the printed image or information appears correct when viewed through the flexible substrate. By using the reverse printing process, and thermally laminating the printed surface of the flexible substrate to the functional substrate (as described below), the printed image or information is viewed correctly in the final product and is protected from damage by the flexible substrate which forms the outermost layer of the packaging material. The flexible substrate comprising the printed image or information can be wound onto a roll or spool and stored until the laminating step is carried out, if required.

In one example, a process for preparing a flexible packaging material comprises a step of providing a further flexible material comprising one or more of a polyethylene, a bi-axially oriented polypropylene (BOPP), a polyethylene teraphthalate (PET), a paper and/or a metallic film; and depositing a thermally activatable laminating layer onto one of the further flexible material and the first surface of the substrate comprising the printed electrophotographic ink composition.

The term "deposition", as used herein, is to be understood as meaning applying a layer of thermally activatable laminating material either to the flexible substrate comprising the printed image or information or to the further flexible material in such a manner that the materials form a structure, for example a film, of defined layers of different materials. In one example, the depositing comprises one or more of rotogravure printing, screen printing, flexo printing and extrusion coating. Such processes and machinery for producing such materials are known in the art.

In one example, the base material, also referred to as the base layer, the further flexible substrate or the functional substrate comprises a material or base layer as described previously. In one example, the thermally activatable laminating layer or thermally activatable laminating material comprise a layer or material as described previously.

In one example, the process may further comprise deposition of a sealant material to form a sealant layer disposed on a surface of the base material other than the surface on which the thermally activatable laminating layer is disposed. The material used to form the sealant layer may be as described previously. The step of depositing the sealant material onto the base material may occur before or after the step of depositing the thermally activatable laminating material. The step of depositing the sealant material may take place by any suitable process, for example, extrusion coating, flexo coating, gravure or screen printing. Thus, in this example, the steps of depositing a thermally activatable laminating material and depositing a sealant material result in a multi-layer or trilayer material being obtained in which a base layer or material has a thermally activatable laminating layer disposed on a first surface and a sealant layer disposed on a surface other than the first surface. In one example, the base material and sealant layer are pre-formed as a functional substrate.

In one example, a process for preparing a flexible packaging material comprises a step of contacting under conditions of heat and/or pressure the thermally activatable laminating layer with the other of the further flexible material and the first surface of the substrate comprising the printed electrophotographic ink composition. This step may be referred to as a laminating step or a thermal laminating step.

In one example, the thermally activatable laminating layer has been deposited onto the further flexible material, and the thermally activatable laminating layer is contacted with the first surface of the substrate comprising the printed electrophotographic ink composition. In one example, the thermally activatable laminating layer has been deposited onto the first surface of the substrate comprising the printed electrophotographic ink composition, and the thermally activatable laminating layer is contacted with the further flexible material.

The result of this step is a thermally laminated flexible packaging material, which, as mentioned previously, comprises the flexible substrate as the intended outermost layer of the packaging in use, thus protecting from damage the printed image or information formed by the electrophotographic ink composition. In one example, the flexible substrate comprising the printed image or information is brought into a particular alignment with the further flexible material or functional substrate before being subjected to the thermal laminating step.

In one example, the laminating step produces the flexible packaging material which is ready for use immediately upon cooling to room temperature. Thus, in one example, the processes for preparing a flexible packaging material described herein require no additional curing time, or stated differently, zero curing time. The presently described processes are therefore advantageous over existing methods for producing flexible packaging materials containing LEP printed images or information in which laminating adhesives are used. Such laminating adhesives, both "solvent-based" and "solvent-free" adhesives require curing times of at least several days, thus removing the advantage of speed that digital printing can offer.

In one example, a process for preparing a flexible packaging material comprises a step of contacting under conditions of heat and/or pressure the thermally activatable laminating layer with one of the further flexible material and the first surface of the flexible substrate comprising the printed electrophotographic ink composition, and a step of cooling the thermally laminated flexible packaging material to room temperature, thereby obtaining a ready-to-use flexible packaging material.

In one example, the laminating step may be carried out on any apparatus suited for performing such a task. Suitable laminating equipment for preparing flexible packaging comprising laminated materials is known in the art. The laminating apparatus on which the thermal laminating step may be carried out may comprise pre-heating rolls, heating or nip rolls, and chill or cooling rolls through which the thermally laminated multilayer material passes, to further speed up the cooling process. The laminating step carried out on the nip roll may be carried out at a temperature and a pressure required to partially melt the thermally activatable laminating material and/or the polymer resin of the electrophotographic ink composition printed on the flexible substrate at the laminating nip, and thereby create a bond between the materials.

In one example, the temperature for the laminating nip or step may be less than about 150° C., for example less than about 120° C., for example less than about 110° C., for example less than about 100° C., for example less than about 90° C., for example about 80° C.

In one example, the temperature for the laminating nip or step may be greater than about 80° C., for example greater than about 90° C., for example greater than about 100° C., for example greater than about 110° C., for example greater than about 120° C., for example about 150° C. It will be understood that the temperature required for efficient thermal lamination will depend on the nature or composition of the thermally activatable laminating material and the associated melting temperature.

In one example, the pressure for the laminating nip or step may be less than about 10 bar, for example less than about 9 bar, for example less than about 8 bar, for example less than about 7 bar, for example less than about 6 bar, for example less than about 5 bar, for example less than about 4 bar, for example less than about 3 bar, for example about 2 bar.

In one example, the pressure for the laminating nip or step may be greater than about 2 bar, for example greater than about 3 bar, for example greater than about 4 bar, for example greater than about 5 bar, for example greater than about 6 bar, for example greater than about 7 bar, for example greater than about 8 bar, for example greater than about 9 bar, for example about 10 bar. It will be understood that the temperature and pressure required for efficient thermal lamination will depend on the nature or composition of the thermally activatable laminating material and the associated melting temperature.

EXAMPLES

The following illustrates examples of the methods and related aspects described herein. Thus, these examples should not be considered as limitations of the present disclosure, but are merely in place to teach how to make examples of compositions of the present disclosure. As such, a representative number of compositions and their method of manufacture are disclosed herein.

Materials

Polymers: Nucrel 699 is a ethylene-methacrylic acid copolymer available from DuPont; AC-5120 is an ethylene acrylic acid copolymer resin available from Honeywell; Pureseal HS1040 is a polyurethane available from Ashland Company; Pureseal HS1020 is a polyurethane available from Ashland Company; G-680 is an ethylene acrylic acid copolymer resin available from Mica Corporation; HME-118B is an ethylene acrylic acid copolymer resin available from Mica Corporation; HMW-160 is an ethylene acrylic acid copolymer resin available from Mica Corporation; HMW-261 is an ethylene acrylic acid copolymer resin available from Mica Corporation.

Base layers: Al foil was obtained from VAW—Hydro, in Germany and/or Carcano, in Italy; PE film was obtained from Polyon Barkai in Israel; PET film was obtained from Polyplex Corporation; Gerbier branded paper for flexible packaging was obtained from Ahlstrom.

Print substrates: PET (12 micron) was obtained from Polyplex Corporation; BOPP (18-40 micron) films were obtained from Dor Films; BOPA films were obtained from Hyosung, Korea; and cast PP was obtained from Etimex, Germany.

Electrophotographic ink composition: toner particles comprising pigment encapsulated by polymer resin blends comprising Nucrel 699 and AC-5120 (in a ratio of 4:1) were dispersed in Isopar-L™, from Exxon.

Apparatus

Printing press: HP Indigo WS6600.

Laminator and coating: LaboCombi 400 from Nordmeccanica

General Methodology

A commercially available print substrate was subjected to an electrophotographic printing step on an HP Indigo WS6600 press operating under the conditions described below using the ink composition described above to form the printed substrate:

Test Parameters
Primer: DP050 from Michelman
Substrates: PET 12 um, BOPP transparent 20 um
Blanket: Iris+

TABLE 1

| Substrate Definitions | | |
|---|---|---|
| | PET | BOPP |
| Type | film | film |
| Material | PET | BOPP |
| Face-stock | transparent | transparent |
| Gloss level | semi-matte | semi-matte |
| Second transfer [kg] | 250 | 250 |
| Blanket Temp [° C.] | 105 | 105 |
| Feed Fan [V] | 8 | 8 |
| PTH [° C.] | off | off |
| Thickness [μm] | 12 | 20 |

TABLE 2

| Inline primer unit (ILP) definitions | | | | |
|---|---|---|---|---|
| Intermediate Coating roller | Drying temp. (° C.) | Coating level | Heat sensitivity | Corona (W) |
| 82 mm rough surface | 80 | High | High | 400 |

Print Procedure
1.1. Install the required substrate and measure surface energy on outer side with dyne pens.
1.2. Change substrate and ILP definitions according to tables above
1.3. Remove coating roller from ILP coating system
1.4. Activate ILP unit
1.5. Apply corona refreshment by operating ILP with system web feed (SWF)
1.6. Measure surface energy of the treated substrate
1.7. Install back ILP coating roller
1.8. Prime about 5 m of substrate without printing with SWF
1.9. Take samples of the primed substrate for coat weight measurements and appearance evaluation
1.10. Target coat weight 0.30±0.02 gsm.
1.11. Perform $1^{st}$ and $2^{nd}$ transfer calibrations
1.12. Perform full colour adjustment and measure OD values with X-Rite with target OD values shown in Table 3.
1.13. Print job
1.14. After printing remove roll to laminator for next step.

TABLE 3

| Target OD values | | | | | |
|---|---|---|---|---|---|
| | Y | M | C | K | W |
| Target OD values | 0.95 ± 0.05 | 1.3 ± 0.05 | 1.3 ± 0.05 | 1.5 ± 0.05 | 0.38 ± 0.05 |

TABLE 3-continued

| | Target OD values | | | | |
|---|---|---|---|---|---|
| | Y | M | C | K | W |
| X-Rite screen | Y | M | C | K | C |

Coating and Laminating Step

TABLE 4

Operating Parameters for LaboCombi 400

| Parameter | Value |
|---|---|
| Unwinder A Tension (N) | 14 |
| Unwinder B Tension (N) | 10 |
| Rewinder Tension (N) | 29.9 |
| Nip temperature (° C.) | 90 |
| Temp after unwinder A and B (° C.) | 35 |
| Nip pressure (bar) | 5 |
| Lamination speed (m/min) | 40 |
| Corona A (W) | 1000 |
| Corona B (W) | 1000 |
| Room temp. (° C.) | 22 |
| Room humidity (%) | 55 |
| Dr blade pressure (bar) | 4 |
| Gravure type | 70 |
| Oven 1 Temp (° C.) | 70 |
| Oven 2 Temp (° C.) | 85 |
| Oven 3 Temp (° C.) | 100 |
| Adhesive coat weight (gsm) | 3.4 |

Set Up & Thickness Measurement:
1. Place base layer in unwinder A
2. Operate laminator, apply thermally activatable laminating material on the base layer in the lamination speed
3. Take a 2 meter sample of the laminate, observe coating uniformity and visibility. If needed add a smoothing bar
4. Measure the coat weight 3 times in various areas to confirm target coat weight reached Lamination
5. Place printed substrate in unwinder A and operate laminator in same speed like in "adhesive thickness measurement" step.
6. Take a sample and observe adhesive appearance. Minimal haze should be noticed
7. Complete lamination and follow sample measurements.

A layer of thermally activatable laminating material as shown in Table 5 was deposited onto a base layer as shown in Table 1 using a LaboCombi 400 from Nordmeccanica apparatus using the procedure outlined above to provide a multilayered material comprising a layer of thermally activatable laminating material on a base film. In Examples 11 and 12 in Table 5, the thermally activatable laminating material was applied to the printed surface of the print substrate.

In Examples 1 to 10 and 13, the printed substrate and multilayer material comprising the base layer and thermally activatable laminating material were then subjected to a laminating step on the same apparatus, in which the layer of thermally activatable laminating material was contacted with the printed surface of the printed substrate at a laminating temperature in the range of 80° C. to 150° C. In Examples 11 and 12 in Table 5, the thermally activatable laminating material applied to the printed surface of the print substrate was contacted with the base material.

Flexible packaging materials were prepared according to the general methodology described above, and as set out in Table 5 below.

The laminate performance was verified at zero cure time by measuring the lamination bond strength immediately after the laminated material had cured to room temperature. Lamination bond strength was measured according to ASTM F0904-98R08 (results are shown in Table 5).

The results suggest that the thermally activated polymers/co-polymers that melt at temperatures of ~80-150° C. melt along with the electrophotographic ink composition in the laminating nip, bond to each other, and after cooling maintain bond strength values which are acceptable for many flexible packaging applications and are comparable to values measured with standard lamination techniques.

While the compositions, methods and related aspects have been described with reference to certain examples, those skilled in the art will appreciate that various modifications, changes, omissions, and substitutions can be made without departing from the spirit of the disclosure. It is intended, therefore, that the invention be limited by the scope of the following claims. The features of any dependent claim may be combined with the features of any of the other dependent claims or any and/or any of the independent claims.

TABLE 5

| Example | Printed substrate (thickness μm) | Thermal laminating material | Thermal laminating material weight (gsm) | Base layer (thickness μm) | Lamination temperature and pressure | Lamination strength (N/inch) |
|---|---|---|---|---|---|---|
| 1 | PET (12) | Pureseal HS1040 | 2.5-3.5 | PE (90) | 90° C., 4 bar | 3.0-5.0 |
| 2 | BOPP (20) | Pureseal HS1040 | 2.5-3.5 | BOPP (20) | 90° C., 4 bar | 1.5-2.0 |
| 3 | PET (12) | Pureseal HS1020 | 2.5-3.5 | PE (90) | 90° C., 4 bar | 2.7-5.0 |
| 4 | BOPP (20) | Pureseal HS1020 | 2.5-3.5 | BOPP (20) | 90° C., 4 bar | 1.0-2.0 |
| 5 | PET/INK | G-680 | 5.5 | G-680/Al// 5.5/30 | 120° C., 4 bar | 6 |
| 6 | PET/INK | G-680 | 5 | G-680/ MET-PET// 5/12 | 120° C., 4 bar | 3.9 |
| 7 | BOPP/INK | G-680 | 4.5 | G-680/ MET-BOPP // 4.5/30 | 110° C., 4 bar | 2.9 |

TABLE 5-continued

| Example | Printed substrate (thickness μm) | Thermal laminating material | Thermal laminating material weight (gsm) | Base layer (thickness μm) | Lamination temperature and pressure | Lamination strength (N/inch) |
|---|---|---|---|---|---|---|
| 8 | BOPA/INK | HME-118B | 7 | HME118B/AI/PE // 7/33/25 | 110° C., 4 bar | 4 |
| 9 | PET/INK | HMW-160 | 4 | HMW-160/Paper/Ionomer/4/40/15 | 140° C., 4 bar | 2.5-8.0 |
| 10 | BOPP/INK | AX8317 | 4 | AX8317/PET/PE/4/12/45 | 90° C., 4 bar | 3.7 |
| 11 | PET/INK/G-680 | G-680 | 5 | Al // 30 | 150° C., 4 bar | 3.6 |
| 12 | PET/INK/G-680 | G-680 | 5 | MET-PET//5/12 | 150° C., 4 bar | 3.9 |
| 13 | BOPA/INK | HME-118B | 5 | AI/PE // 7/33/25 | 150° C., 4 bar | 4 |

The invention claimed is:

1. A flexible packaging material, comprising:
a flexible substrate comprising a first surface;
an electrophotographic ink composition printed on the first surface of the flexible substrate, the printed electrophotographic ink composition comprising a polymer resin comprising a copolymer of an alkylene monomer and a monomer selected from acrylic acid and methacrylic acid;
a base material comprising one or more of a polyethylene, a bi-axially oriented polypropylene (BOPP), a polyethylene terephthalate (PET), a paper and/or a metallic film; and
a thermally activatable laminating layer disposed between and bonded to the base material and to the first surface of the flexible substrate printed with the electrophotographic ink composition, the thermally activatable laminating layer comprising a copolymer of an alkylene monomer and a monomer selected from acrylic acid and methacrylic acid.

2. The flexible packaging material of claim 1, wherein the base material comprises a metallic foil, a metallized BOPP or a metallized paper.

3. The flexible packaging material of claim 1, wherein the flexible substrate comprises a film of thermoplastics material.

4. The flexible packaging material of claim 1, wherein the flexible substrate comprises a film of biaxially oriented polypropylene or poly(ethylene) terephthalate.

5. The flexible packaging material of claim 1, wherein the thermally activatable laminating layer is from 2 to 10 μm in thickness.

6. The flexible packaging material of claim 1, further comprising a sealant layer disposed on a surface of the base material other than the surface on which the thermally activatable laminating layer is disposed.

7. A process for preparing a flexible packaging material, comprising:
printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
providing a further flexible material comprising one or more of a polyethylene, a bi-axially oriented polypropylene (BOPP), a polyethylene terephthalate (PET), a paper and/or a metallic film;
depositing a thermally activatable laminating layer onto one of the further flexible material and the first surface of the substrate comprising the printed electrophotographic ink composition, the thermally activatable laminating layer comprising a copolymer of an alkylene monomer and a monomer selected from acrylic acid and methacrylic acid; and
contacting under conditions of heat and/or pressure the thermally activatable laminating layer with the other of the further flexible material and the first surface of the substrate comprising the printed electrophotographic ink composition.

8. The process for preparing a flexible packaging material of claim 7, wherein the base material comprises a metallic foil or a metallized substrate.

9. The process for preparing a flexible packaging material of claim 7, wherein the thermally activatable laminating layer is deposited onto one of the further flexible material and the first surface of the substrate comprising the printed electrophotographic ink composition by one or more of screen printing, rotogravure printing, flexo printing.

10. The process for preparing a flexible packaging material of claim 7, wherein the thermally activatable laminating layer is contacted with the other of the further flexible material and the first surface of the flexible substrate comprising the printed electrophotographic ink composition at a temperature of less than 150 °C.

11. The process for preparing a flexible packaging material of claim 7, further comprising cooling the material obtained from the step of contacting the thermally activatable laminating layer with the other of the further flexible material and the first surface of the flexible substrate comprising the printed electrophotographic ink composition, thereby producing the flexible packaging material.

12. A process for preparing a flexible packaging material, comprising:
providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;

providing a further flexible material comprising one or more of a polyethylene, a bi-axially oriented polypropylene (BOPP), a polyethylene terephthalate (PET), a paper and/or a metallic film;

depositing a thermally activatable laminating layer onto one of the further flexible material and the first surface of the substrate comprising the printed electrophotographic ink composition, the thermally activatable laminating layer comprising a copolymer of an alkylene monomer and a monomer selected from acrylic acid and methacrylic acid; and contacting under conditions of heat and/or pressure the thermally activatable laminating layer with the other of the further flexible material and the first surface of the substrate comprising the printed electrophotographic ink composition.

13. A flexible packaging material made by the process of claim 7.

14. A flexible packaging material made by the process of claim 12.

15. The flexible packaging material of claim 6, wherein the sealant layer comprises a copolymer of an alkylene monomer and a monomer selected from acrylic acid and methacrylic acid.

16. The flexible packaging material of claim 6, wherein the sealant layer comprises a polymer selected from the group consisting of ethylene or propylene acrylic acid co-polymers; ethylene or propylene methacrylic acid co-polymers; ethylene vinyl acetate co-polymers; co-polymers of ethylene or propylene, and an alkyl ester of methacrylic or acrylic acid; co-polymers of ethylene, acrylic or methacrylic acid, and an alkyl ester of methacrylic or acrylic acid; co-polymers of ethylene or propylene and maleic anhydride; polyethylene; polystyrene; isotactic polypropylene; co-polymers of ethylene ethyl acrylate; polyesters; polyvinyl toluene; polyam ides; styrene/butadiene co-polymers; epoxy resins; acrylic resins; ethylene-acrylate terpolymers: ethylene-acrylic esters-maleic anhydride (MAH) terpolymers; glycidyl methacrylate (GMA) terpolymers; ethylene-acrylic acid ionomers; urethane polymers; and combinations thereof.

17. A flexible packaging material, consisting of:

a flexible substrate comprising a first surface;

an electrophotographic ink composition printed on the first surface of the flexible substrate, the printed electrophotographic ink composition comprising a polymer resin comprising a copolymer of an alkylene monomer and a monomer selected from acrylic acid and methacrylic acid;

a base material comprising one or more of a polyethylene, a bi-axially oriented polypropylene (BOPP), a polyethylene terephthalate (PET), a paper and/or a metallic film;

a thermally activatable laminating layer disposed between and bonded to the base material and to the first surface of the flexible substrate printed with the electrophotographic ink composition, the thermally activatable laminating layer comprising a copolymer of an alkylene monomer and a monomer selected from acrylic acid and methacrylic acid; and optionally a sealant layer disposed on a surface of the base material other than the surface on which the thermally activatable laminating layer is disposed.

* * * * *